Sept. 12, 1950 V. H. HASSELQUIST 2,521,848
TUBULAR RIVET
Filed March 1, 1945
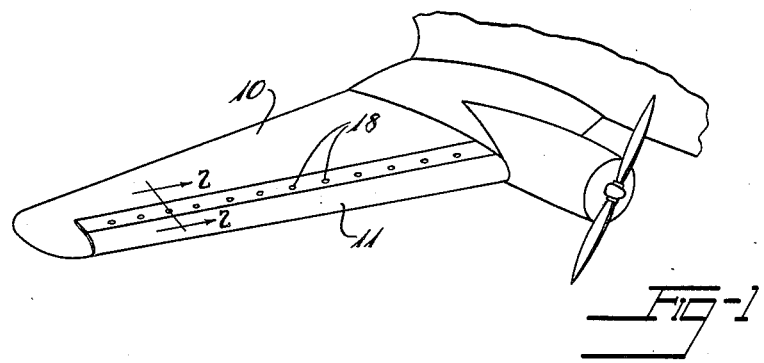
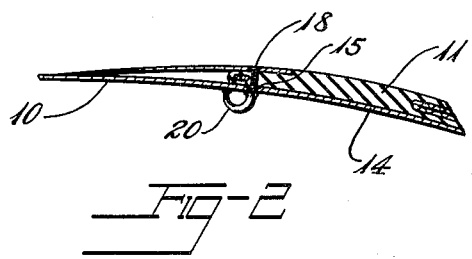
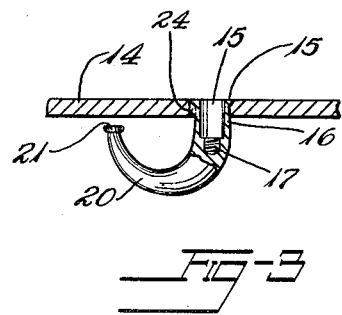
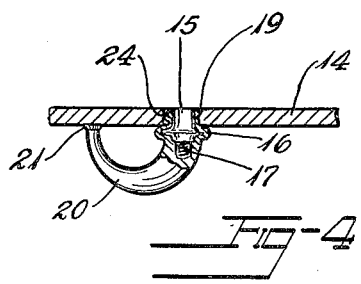
Inventor
Victor H. Hasselquist
By
Att'y Patented Sept. 12, 1950

2,521,848

UNITED STATES PATENT OFFICE 2,521,848

TUBULAR RIVET

Victor H. Hasselquist, Akron, Ohio, assignor to
The B. F. Goodrich Company, New York, N. Y.,
a corporation of New York Application March 1, 1945, Serial No. 580,382

2 Claims. (Cl. 85—40)

This invention relates to tubular rivets such as are used to provide an anchorage at the surface of a sheet material, and is especially useful where ice-removing equipment or similar apparatus is to be attached to the thin sheet metal skin of an airplane or the like and subjected to a force acting parallel to the surface of attachment.

An object of the invention is to provide resistance to tipping of the tubular rivet under the lateral force.

Other objects are to provide a rivet with a laterally extending bracing structure to prevent distortion of the sheet material, and to provide a bracing structure capable of placement with the rivet from one side of the sheet material through an aperture therethrough.

These and other objects will appear from the following description and the accompanying drawings.

Of the drawings,

Fig. 1 is a perspective view of a portion of an airplane having ice-removing apparatus secured thereto by rivets constructed in accordance with and embodying the invention.

Fig. 2 is a sectional view thereof taken on line 2—2 of Fig. 1.

Fig. 3 is a sectional view of an apertured sheet of material showing a rivet of the invention entered through the aperture in position for attachment thereto.

Fig. 4 is a similar view showing the rivet secured in place.

Referring to the drawings, the numeral 10 designates an airfoil such as a wing of an airplane about the leading edge of which is secured under tension an ice-removing shoe 11, the ice-removing shoe being secured to the skin 14 of the airfoil along the lateral margins of the shoe by tubular rivets 15 constructed in accordance with and embodying the invention. Each rivet comprises a tubular hollow body of ductile material, such as metal, having a plain-bored collapsible tubular portion 16 and a concentric internally threaded portion 17 for receiving an anchoring screw 18. The tubular portion terminates in a head 19 which may be outwardly tapered as shown, so as to be adapted to seat in a countersink about the aperture in the sheet material. The arrangement is such that with the rivet entered through the aperture with its flange seated against the sheet material and held therein by a reactive force, a threaded rod entered through the rivet and engaging its threaded portion may be used to exert a pulling force outwardly to collapse or upset the tubular portion 16, as shown in Fig. 4, to retain the rivet in place.

For bracing the rivet against tipping under a force applied along the sheet of material and to distribute such force over a greater area of the sheet material, the rivet is provided with a laterally extending bracing arm 20 arranged to bear against the under side of the sheet material at an appreciable distance from the axis of the rivet when the rivet has been upset in the aperture. For facilitating entry of the arm through the aperture in the sheet material the arm is curved to form a horn-like extension of the rivet body and is preferably tapered throughout its length, decreasing in cross section away from the tubular body of the rivet to a position near its free end where it is flanged outwardly as at 21 to provide a broad bearing against the sheet material, preferably smaller in area than the body of the rivet so as to enable its passing through the aperture. In the uncollapsed condition, the flanged portion 21 is spaced from the under side of the sheet, when the rivet is in place in the aperture, by an amount equal to the amount which the tubular portion is shortened during collapse thereof so as to bring the flanged end 21 against the sheet upon collapse of the rivet.

In attaching the rivet, the rivet is entered through the aperture, end 21 first, until its large flanged end seats in the countersink about the aperture. The rivet is then collapsed in the usual way as by use of a tool such as that of the Waner Patent No. 2,069,907. Before upsetting the rivet, it is turned in the aperture to a position where the arm 20 extends in the direction of the tensioning force on the ice-removing equipment and away from the margin of the ice-removing equipment where it tends to be pressed upwardly against the sheet when subjected to the tensioning force, thereby distributing the force and preventing tipping or tilting of the rivet. If desired, the rivet may be formed with a key 24 in any suitable manner and the sheet material correspondingly slotted to assist in locating the rivet for proper alignment of the arm 20.

Variations may be made without departing from the scope of the invention as it is defined by the following claims.

I claim:

1. A tubular rivet adapted to be inserted and attached in a wall aperture from one side thereof, said rivet comprising a body, a flange on said body, a bore extending into said body from the flanged end thereof, said bore having a threaded portion spaced from said flanged end for engaging a threaded member inserted from said flanged end to upset the body portion intermediate said threaded portion and the flanged end for retaining the wall between the upset portion and said flange, and an arm extending as a continuation of said body from the end thereof laterally remote from said flange to a position spaced from said body and moveable toward said flange as a result of the shortening of said body in the upsetting for bracing the rivet against the back side of said wall, said arm throughout its extent being no greater in cross-section than said body, and said arm being curved and tapered away from said body and terminating in an enlarged bearing portion no greater in cross-section than said body.

2. A tubular rivet adapted to be attached to a wall in an aperture therethrough, said rivet comprising a body of a cross-section throughout its length to be readily passed through the aperture, a retaining head integral with said body, said body continuing in a return-bent portion to a wall-engaging end thereof opposite said head, a bore extending axially of said body through said head and providing a tubular portion of said body adjacent said head expansible outwardly by pressure applied axially of the body to upset said body against the wall at said aperture and to move said wall-engaging end of said body toward the head at a position remote from said aperture as a result of the shortening of said body in the upsetting.

VICTOR H. HASSELQUIST.

REFERENCES CITED

The following references are of record in the file of this patent:

UNITED STATES PATENTS

| Number | Name | Date |
|---|---|---|
| 632,584 | Oehring | Sept. 5, 1899 |
| 663,520 | Shipman | Dec. 11, 1900 |
| 1,305,560 | Akamoto | June 3, 1919 |
| 1,358,687 | Lyon | Nov. 9, 1920 |
| 1,716,144 | Morrison | June 4, 1929 |
| 1,869,162 | Miner | July 26, 1932 |
| 1,912,653 | Olson | June 6, 1933 |
| 2,149,199 | Waner | Feb. 28, 1939 |
| 2,188,422 | Waner | Jan. 30, 1940 |
| 2,258,822 | Sturgiss et al. | Oct. 14, 1941 |
| 2,348,326 | Burrows et al. | May 9, 1944 |

FOREIGN PATENTS

| Number | Country | Date |
|---|---|---|
| 36,173 | Netherlands | Aug. 15, 1935 |